(No Model.)

C. W. WEISS.
FEED MECHANISM FOR SEWING MACHINES.

No. 405,448. Patented June 18, 1889.

Attest:
A. N. Jesbera
E. W. Watson

Inventor:
Charles W. Weiss
By David A. Burr
Atty.

UNITED STATES PATENT OFFICE.

CHARLES W. WEISS, OF BROOKLYN, ASSIGNOR OF ONE-HALF TO CHARLES KRUSE, OF NEW YORK, N. Y.

FEED MECHANISM FOR SEWING-MACHINES.

SPECIFICATION forming part of Letters Patent No. 405,448, dated June 18, 1889.

Application filed March 21, 1889. Serial No. 304,147. (No model.)

*To all whom it may concern:*

Be it known that I, CHARLES W. WEISS, of Brooklyn, in the county of Kings and State of New York, have invented certain new and useful Improvements in the Feed Mechanism of Sewing-Machines; and I do hereby declare that the following is a full and exact description thereof, reference being had to the accompanying drawings, and to the letters of reference marked thereon, making a part of this specification.

My invention relates to the feed mechanism of a sewing-machine, and has for its object to facilitate the adjustment of the length of stroke of a reciprocating feed-dog and render its movements noiseless.

It consists, mainly, in the combination, with the reciprocating arm by which the dog is moved back and forth in a horizontal plane and the swinging arm to which the rock-shaft carrying the reciprocating arm is secured, of a connecting-link to which the bar is pivoted, and which admits of movement for adjustment to and from the pivot of the swinging arm, so as to lengthen or shorten the arc of vibration of said arm, and consequently the length of horizontal movement of the dog, as is hereinafter fully described and claimed.

Figure 1:
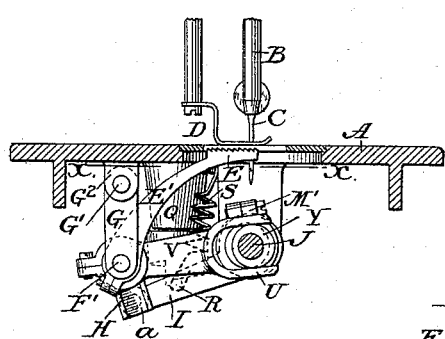
Figure 2:
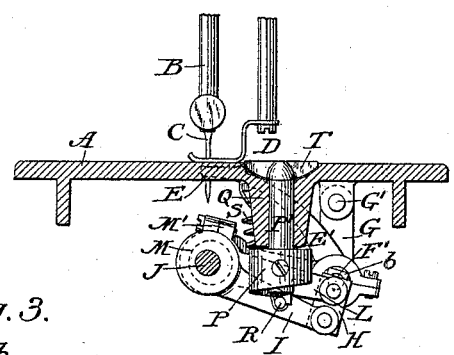
Figure 3:
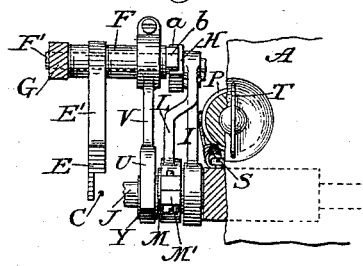
Figure 4:
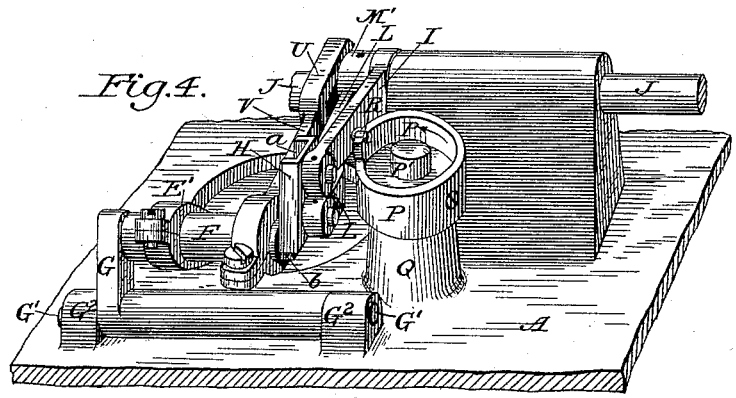

In the accompanying drawings, Figure 1 is an elevation in detail of the feed-dog, its arm, and actuating mechanism, the table and main shaft of the machine being in section. Fig. 2 is a similar elevation, partly in section, of the same parts from the opposite side. Fig. 3 is a plan view of the same parts, the table being partly broken away to expose them, and Fig. 4 is a bottom view in perspective of the feeding mechanism and of the under side of the table to which it is attached.

A represents the table, B the needle-bar, C the needle, and D the presser-foot, of a sewing-machine. E is the feed-dog having the customary four-way movements. This dog is formed or secured upon the end of an arm E' projecting from a sleeve F, turning loosely upon a shaft F' secured to the end of an arm G to project at a right angle therefrom in line parallel with a rock-shaft G', pivoted to oscillate between lugs G² G² upon the under side of the table A, as shown in Fig. 4.

The arm G, and with it the oscillating sleeve F, will thus swing freely upon said rock-shaft G' as its pivotal axis. By means of the swinging movement of the sleeve F upon the axis of the shaft G' the feed-dog E is permitted to reciprocate in substantially a horizontal plane. The up-and-down movement of the dog is produced synchronically with its reciprocating movement by the engagement of a fork U at the free end of an arm V projecting from the sleeve F with an eccentric Y upon the main rotating shaft J, as shown in Figs. 1 and 4.

The reciprocation of the dog is produced and the extent of the movement is controlled and adjusted by means of a link H, which is pivoted at one end to the free end of an arm I, pivoted at its other end to swing upon said main rotating shaft J. The free end of the link is made to engage the end of the shaft F', preferably, by means of a groove or channel *a* on the face of the link (see Fig. 4) adapted to receive a rectangular head *b* (see Fig. 3) on the end of the shaft. The link is thus left free to slide transversely upon said head across the end of the shaft F' to and from the axis G', upon which the shaft swings, and yet remain in constant engagement therewith.

The free end of the link H is made to vibrate upon its pivotal connection with the arm I as a center, and thereby cause the shaft F' to swing upon its axis at G' by means of an arm L, pivoted to said free end, and which is made to reciprocate by an eccentric M on the main shaft J, to which it is coupled in the customary manner by an encircling band M'. (See Figs. 3 and 4 and dotted lines, Fig. 2.)

The pivotal axis upon which the link H swings is adjusted to and from the pivotal axis at G', upon which the rock-shaft F oscillates, by an adjustment to and from the table A of the outer end of the arm I, carrying the pivot for the link.

I contemplate various means for effecting this adjustment—as, for example, by mounting an annular cam-plate P upon the end of a pin P', fitted to revolve in a stud Q, projecting from the under side of the table, as shown in Figs. 2 and 4. The bottom edge of the annular cam-plate is made to describe a spiral and to engage a pin R projecting laterally from the arm I, the pin being held up into constant contact with the cam by means of a suitable spring S. (See Figs. 1 and 3.)

The pin P', carrying the cam, is made to extend up through an aperture in the table, and is fitted with a thumb-piece T, by which it may be readily turned and the position of the cam indicated. By turning the cam in one direction the pin R and arm I will be carried away from the table and in the opposite direction will be allowed to approach the table under the stress of the spring S.

As the arm I approaches the table, the radius of the arc described by the point of contact of the link H vibrating upon the arm I with the shaft F', oscillating with the arm G upon the axis of the shaft G', will be shortened, so that the length of stroke or vibration of said shaft F', as it is actuated by the movement of the link, will be reduced, while conversely, as the arm I is carried from the table and the radius of the contact-point of the link H with the shaft F' is lengthened, the length of stroke imparted to the shaft by the vibration of the link will be correspondingly increased.

It is evident that the pin R may enter a spiral groove in the face of the annular plate P instead of bearing against a spirally-inclined lower edge, and that in such case the need of the spring S will be obviated, and, furthermore, that various mechanical appliances known to the art may be substituted for the cam and pin to adjust and determine the position of the arm I with reference to the table A, and I contemplate the use of such well-known equivalents in this connection.

I claim as my invention—

1. The combination, in a sewing-machine, with its rotating shaft, its table, a swinging arm dependent from the table, a shaft secured to the free end of said arm, a sleeve upon said shaft, a bar coupling said sleeve with an eccentric on the rotating shaft, and a feed-dog carried by the sleeve to rise and fall and move back and forth with the vibration of said shaft and the oscillation of said sleeve, of an adjustable arm pivoted to the main shaft, an adjustable link pivoted to vibrate upon said arm and made to engage loosely the end of the sleeve-shaft, and a second arm coupled to the link and actuated by an eccentric on the main shaft to produce an oscillation of the link upon its pivotal center, all substantially in the manner and for the purpose herein set forth.

2. The combination, in a sewing-machine, with its rotating main shaft, its table, a swinging arm dependent from the table, a shaft secured to the free end of said arm, a sleeve upon said shaft, a bar coupling said sleeve with an eccentric on the rotating shaft, and a feed-dog carried by the sleeve to partake of its movements, of an arm pivoted to the main shaft, a vibrating link engaging loosely the end of the sleeve-shaft and pivoted to said arm to move with it to and from the axis upon which the swinging arm carrying the sleeve-shaft vibrates, an eccentric on the main shaft, a bar coupling said link with said eccentric, an annular cam dependent from the table to engage the arm to which the link is pivoted, and a thumb-piece fitted on the table and actuating said cam, all substantially in the manner and for the purpose herein set forth.

In testimony whereof I have signed my name to this specification in the presence of two subscribing witnesses.

CHAS. W. WEISS.

Witnesses:
A. N. JESBERA,
E. M. WATSON.